Dec. 30, 1969  H. A. LOWTHER  3,487,428

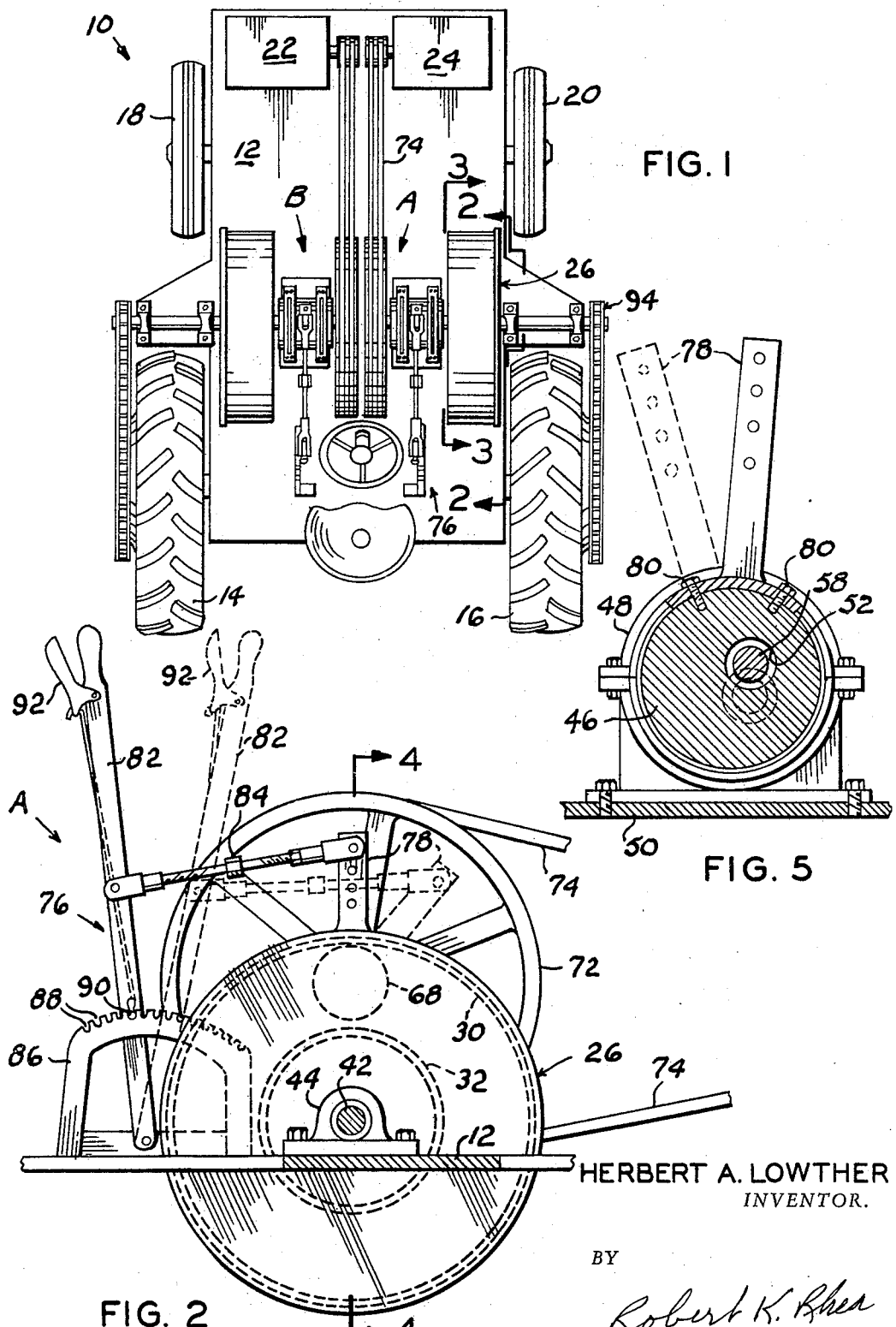

FRICTION DRIVE TRANSMISSION

Filed March 15, 1968 2 Sheets-Sheet 2

HERBERT A. LOWTHER
*INVENTOR.*

BY

*Robert K. Rhea*
AGENT

_United States Patent Office_ 3,487,428
Patented Dec. 30, 1969

3,487,428
FRICTION DRIVE TRANSMISSION
Herbert A. Lowther, Talihina, Okla.
(Star Route, Muse, Okla. 74949)
Filed Mar. 15, 1968, Ser. No. 713,378
Int. Cl. F16h 15/44
U.S. Cl. 74—202      3 Claims

ABSTRACT OF THE DISCLOSURE

A friction plate, having an endless channel, is coaxially connected with a shaft journaled by bearings mounted on a support. An eccentrically bored cylinder is journaled by bearings mounted on the support. A stub shaft is journaled by the eccentric bore of the cylinder and projects at one end portion into the endless channel. A friction roller surrounds the end portion of the stub shaft within the endless channel. The other end of the stub shaft is driven by a prime mover. A lever, connected with the cylinder, rotates it within its bearings in opposing directions for frictional driving contact between the friction roller and the walls forming the endless channel for driving the shaft.

CROSS REFERENCE TO RELATED APPLICATION

The present invention is an improvement over my copending application Ser. No. 521,565, filed Jan. 19, 1966 for Sawmill Feed Device, now Patent No. 3,373,780.

BACKGROUND OF THE INVENTION

The present invention relates to power transmissions and more particularly to a power driven shaft having a friction roller engageable with a friction plate for driving a shaft in opposing directions.

The above patent features a vertically movable friction roller for engaging opposing leg surfaces of a horizontally disposed U-shaped channel for reciprocating the channel and moving a log holding carriage.

Thus, the above patent is limited in its application to a stationary unit which reciprocates an elongated channel. This type of friction drive is applicable to other types of power transmissions regularly subjected to excessive strain and wear which results in damage to conventional transmissions of the gear type. For example, in the sawmill industry it is necessary, after the timber has been felled and cut to log or board lengths, to skid the logs away from their initial position to a point of pickup or transfer to a sawmill. This presents a number of difficulties particularly in soft soil approaching swamp-like conditions. Heretofore this skidding of logs has been accomplished by using a team of mules but when the mass of the log is relatively large and the soil is soft the mules bog down and are unable to move the log. Conventional tractor-type vehicles featuring relatively large driving wheels having pneumatic tires or a caterpillar type tractor are capable of moving over such soft soil, but because of their low hung construction characteristics, bog down in the soil and are incapable of moving relatively large logs. This invention, on the other hand, comprising a power driven friction roller mounted on a platform support, drives a friction plate having an endless channel wherein the shaft, mounting the friction plate, is reversibly connected with the driving wheels of a tractor-like vehicle mounted on relatively large pneumatic tired wheels and having a high axle clearance. The friction drive characteristic of the transmission, when mounted on such a vehicle, one unit for each driving wheel, permits turning the vehicle in a relatively tight radius and forward or reverse movement for dragging logs, or the like, across soft soil.

SUMMARY OF THE INVENTION

A friction plate, having a U-shaped endless channel, is coaxially connected to a shaft journaled by bearings mounted on a support. An eccentrically bored cylinder is journaled by bearings mounted on the support adjacent the friction plate opposite the shaft. A stub shaft extends through and is journaled by the eccentric bore in the cylinder. One end of the stub shaft projects into the endless channel and is coaxially connected with a friction roller loosely received by the walls forming the endless channel. A prime mover is connected with the other end of the stub shaft and lever means connected with the cylinder rotates the latter within its bearings in opposing directions for frictional engagement between the friction roller and walls forming the endless channel for driving the friction plate and its shaft in a selected direction.

The principal object of this invention is to provide a friction drive or transmission for rotating a shaft in opposing directions which eliminates any gear type transmission.

BRIEF DESCRIPTION OF THE DRAWINGS

FIGURE 1 is a top plan view of two of the transmissions installed on a tractor-type vehicle;

FIGURE 2 is a fragmentary side elevational view, to a larger scale, partially in section taken substantially along the line 2—2 of FIG. 1;

DESCRIPTION OF THE PREFERRED EMBODIMENT

Figure 4:
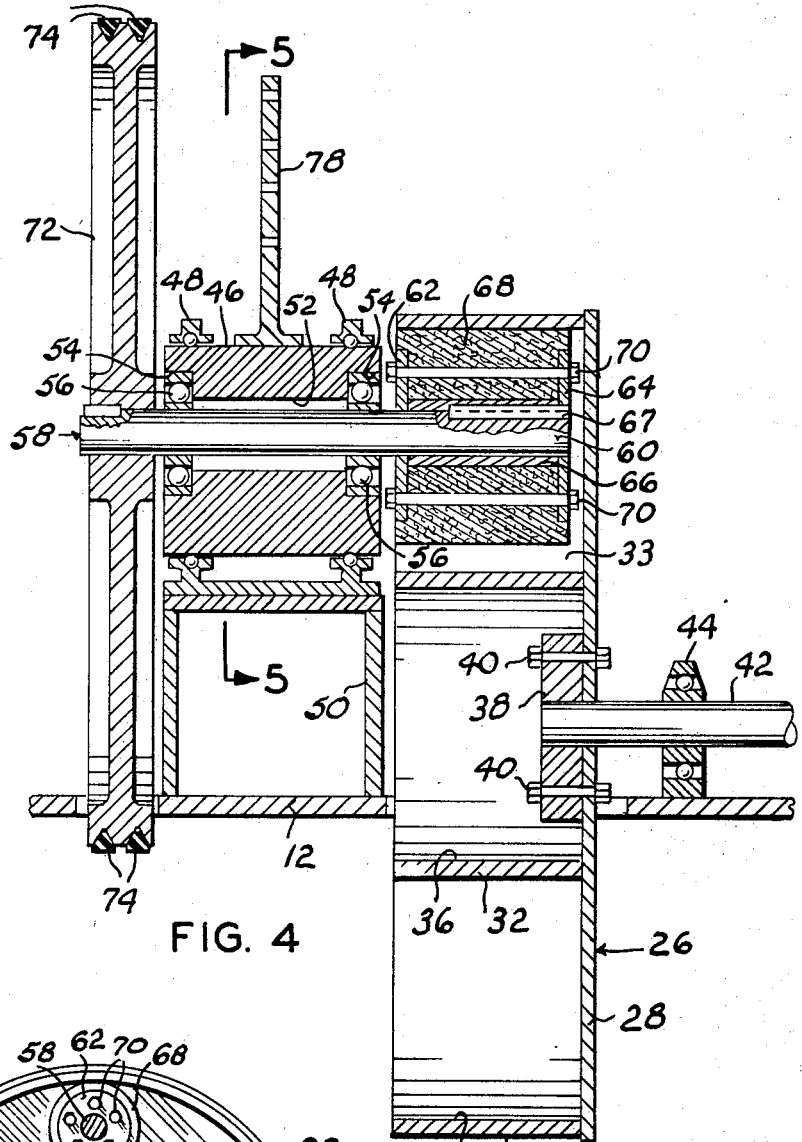
FIGURE 4 is a vertical cross-sectional view, to a different scale, taken substantially along the line 4—4 of FIG. 2; and, FIGURE 5 is a vertical cross-sectional view taken substantially along the line 5—5 of FIG. 4.
Figure 3:
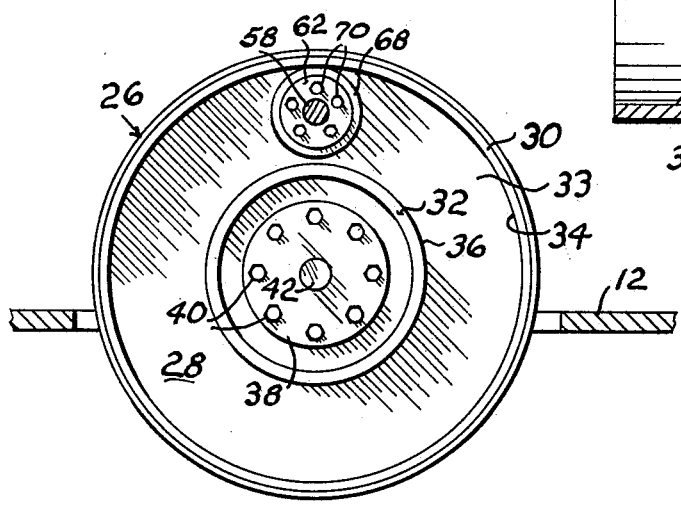
FIGURE 3 is a side elevational view, partially in section, of the friction plate, taken substantially along the line 3—3 of FIG. 1.

Like characters of reference designate like parts in those figures of the drawings in which they occur.

In the drawings:

The reference numeral 10 indicates a vehicle having a horizontal platform or support 12 supported by rearward pneumatic tire-equipped driving wheels 14 and 16 and front wheels 18 and 20. A pair of engines or prime movers 22 and 24 are mounted on the forward end portion of the support 12.

The above description forms no part of the present invention but is set forth, by way of example, to show the application of the invention when mounted thereon. Two pairs of the transmission units, indicated generally at A and B, are mounted in side by side relation on the support 12. Since the transmission B is a mirror image of the transmission or unit A, only the unit A will be described in detail.

A friction plate means 26 comprises a disk 28, and endless outer and inner rings or circular walls 30 and 32, respectively, which are concentrically connected to one side of the disk 28. The endless walls 30 and 32, in combination with the disk 28, thus form an endless U-shaped channel 33 defined by the inner wall surfaces 34 and 36 of the respective ring-like walls 30 and 32. The disk 28 is coaxially connected to a flange 38 secured to the disk by bolts and nuts 40. A shaft 42 is rigidly connected coaxially to the flange 38. Pillow block bearings 44, mounted on the support 12, journal the shaft 42. An eccentrically bored cylindrical member 46 is journalled by bearings 48 mounted on a box-like housing 50 so that the longitudinal axis of the cylinder 46 is perpendicular to and intersects the toric axis of the endless channel 33 as the latter is rotated about the axis of the shaft 42 as hereinafter explained.

The cylinder 46 is longitudinally bored eccentrically, as at 52, and counterbored at each end, as at 54, for receiving bearings 56 which journal a stub shaft 58. One end portion 60 of the stub shaft projects into the endless channel and is coaxially connected with a pressure plate 62 of less diameter than the transverse distance between the endless walls 30 and 32. The pressure plate 62 is disposed adjacent the cylinder 46 in the plane defined by the free edge surfaces of the walls 30 and 32. A similar end plate 64 is keyed to the end of the shaft 58 within the endless channel. A spacer 66, comprising a tube, surrounds the shaft 58 between the pressure plate 62 and end plate 64. A key 67 connects the spacer 66 and end plate 64 to the shaft 58. A friction roller 68 coaxially surrounds the spacer 66 between the end plate 64 and pressure plate 62 and is held in place by bolts 70 extending through the roller 68, end plate 64 and pressure plate 62. Diametrically the roller 68 is smaller than the transverse distance between the endless walls 30 and 32 for the purposes presently explained.

The outer end portion of the shaft 58 is keyed to a pulley 72 of selected size for rotating the shaft 58. In the example shown by FIG. 1, the pulley 72 is connected with a drive pulley of the prime mover 24 by belts 74. Control means 76 rotates the cylinder 46 about its longitudinal axis to frictionally engage the friction roller 68 with the channel wall surface 34 or 36, as desired. The control means 76 comprises an arm 78 rigidly connected by bolts 80 to a peripheral portion of the cylinder 46. The arm 78 is connected to a cultivator-type lever 82 by a turnbuckle type connecting link 84. The lever 82 is pivotally mounted on a bracket 86 having a series of notches 88 engageable by a pin 90 in turn controlled by a handle 92 at the free end of the lever 82 for moving the free end portion of the arm 78 and rotating the cylinder 46 about its longitudinal axis. Rotating the cylinder 46 positions the friction roller 68 in driving contact with the channel wall surface 34 when the arm is moved in one direction and moving the roller 68 for contact with the inner wall surface 36 of the other side of the endless channel when the arm 78 is moved in the other direction. Obviously the arm 78 may be connected with a pressure cylinder, in a conventional manner, not shown, for effecting its movement if desired. The free end of the shaft 42 is connected with any component it is intended to drive. In the example shown by FIG. 1, the shaft 42 is connected to the rear wheel 16 by chain and sprocket means 94, respectively, coaxially connected with the shaft 42 and wheel 16.

OPERATION

In operation the unit A is assembled as described hereinabove with a prime mover driving the pulley 72 and the shaft 42 connected with a component to be driven. The lever 78 is moved to rotate the cylinder 46 and move the friction roller 68 into engagement with the endless channel wall surface 34 which rotates the friction plate means 26 in one direction about the longitudinal axis of the shaft 42 at one rate of rotation. Movement of the arm 78, in the opposite direction, places the friction roller 68 in contact with the channel wall surface 36 which rotates the friction plate means 26 and the shaft 42 in the opposite direction and at a different rate of rotation.

Obviously the invention is susceptible to some change or alteration without defeating its practicability, and I therefore do not wish to be confined to the preferred embodiment shown in the drawings and described herein.

I claim:

1. A friction drive transmission, comprising: a support; a shaft; a stub axle; mounting means on said support journalling said axle and said shaft in parallel spaced relation, friction plate means comprising a disk coaxially connected with said shaft, and having spaced-apart circular outer and inner wall surfaces concentrically connected to one face of said disk and forming an endless channel loosely receiving one end portion of said axle, said mounting means comprising an eccentrically bored cylinder having its longitudinal axis disposed perpendicular with respect to the toric axis of said endless channel, bearing means within the eccentric bore surrounding said axle, and other bearing means mounted on said support and journalling said cylinder; a friction roller coaxially connected with said one end portion of said axle; driving means connected with and driving the other end portion of said axle in one direction; and control means connected with said axle for moving said friction roller into and out of driving contact with said outer and said inner wall surface, respectively.

2. Structure as specified in claim 1 in which the control means includes a lever connected at one end to a peripheral portion of said cylinder for rotating it about its longitudinal axis and moving the longitudinal axis of the eccentric bore toward and away from the circular wall surfaces forming the endless channel.

3. Structure as specified in claim 2 in which said mounting means further includes pillow block bearings surrounding said shaft; and a housing interposed between said support and said other bearing means journalling said cylinder.

References Cited

UNITED STATES PATENTS 1,168,290   1/1916   Demorest _____ 74—202 XR

FOREIGN PATENTS 1,353,253   1/1964   France.

FRED C. MATTERN, Jr., Primary Examiner

JAMES A. WONG, Assistant Examiner